United States Patent
Park et al.

(10) Patent No.: US 9,564,940 B2
(45) Date of Patent: Feb. 7, 2017

(54) METHOD AND APPARATUS FOR DISPLAYING INFORMATION ABOUT WIRELESS CHARGING PAD IN ELECTRONIC DEVICE

(71) Applicant: Samsung Electronics Co., Ltd., Suwon-si, Gyeonggi-do (KR)

(72) Inventors: Ji-Hyun Park, Seongnam-si (KR); Jung-Hyung Kim, Suwon-si (KR); Bo-Ram Namgoong, Seoul (KR); Sang-Mi Park, Anyang-si (KR); Sung-Kwang Yang, Suwon-si (KR); Bo-Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 14/150,337

(22) Filed: Jan. 8, 2014

(65) Prior Publication Data

US 2014/0194099 A1    Jul. 10, 2014

(30) Foreign Application Priority Data

Jan. 8, 2013    (KR) ........................ 10-2013-0002157

(51) Int. Cl.
*H04B 5/00* (2006.01)
*H02J 50/90* (2016.01)
*H04B 1/3883* (2015.01)
*H04W 4/00* (2009.01)
*H04W 4/02* (2009.01)

(52) U.S. Cl.
CPC ............. *H04B 1/3883* (2013.01); *H02J 50/90* (2016.02); *H04B 5/0037* (2013.01); *H04W 4/008* (2013.01); *H04W 4/02* (2013.01)

(58) Field of Classification Search
CPC ........ H02J 7/025; H02J 7/0027; H02J 7/0021; H02J 17/00; H02J 7/0047; H02J 5/005; H02J 7/0044; H02J 2007/0096; H04W 4/008; H04W 4/02; H04B 5/0037; H04B 1/3883; H04B 5/00; H04M 1/7253; A61B 8/56; H01F 38/14; H01M 10/488
See application file for complete search history.

(56) References Cited

U.S. PATENT DOCUMENTS

| | | | | |
|---|---|---|---|---|
| 7,826,873 | B2 * | 11/2010 | Telefus | H02J 5/005 320/108 |
| 8,102,147 | B2 * | 1/2012 | Jung | H02J 7/025 320/108 |
| 8,193,766 | B2 * | 6/2012 | Rondoni | A61N 1/37247 320/108 |

(Continued)

FOREIGN PATENT DOCUMENTS

| | | |
|---|---|---|
| CN | 101459981 A | 6/2009 |
| CN | 102668317 A | 9/2012 |

(Continued)

*Primary Examiner* — Matthew Sams
(74) *Attorney, Agent, or Firm* — Jefferson IP Law, LLP

(57) ABSTRACT

A method and apparatus for providing information about a plurality of wireless charging pads to an electronic device such that the electronic device performs wireless charging efficiently is provided. The method includes receiving information about the plurality of wireless charging pads and displaying the information about the plurality of wireless charging pads on a screen of the electronic device.

9 Claims, 15 Drawing Sheets

(56) References Cited

U.S. PATENT DOCUMENTS

| | | | |
|---|---|---|---|
| 8,427,100 B2* | 4/2013 | Vorenkamp | H02J 17/00 320/107 |
| 2007/0096691 A1 | 5/2007 | Duncan et al. | |
| 2009/0156268 A1 | 6/2009 | Kim et al. | |
| 2010/0185096 A1* | 7/2010 | Miyachi | A61B 8/00 600/459 |
| 2011/0115431 A1 | 5/2011 | Dunworth et al. | |
| 2011/0148343 A1* | 6/2011 | Lee | H01M 10/465 320/101 |
| 2011/0221390 A1 | 9/2011 | Won et al. | |
| 2012/0091951 A1* | 4/2012 | Sohn | H02J 7/0047 320/108 |
| 2012/0115549 A1* | 5/2012 | Kim | H02J 7/0047 455/566 |
| 2012/0295634 A1* | 11/2012 | Kim | H02J 7/025 455/456.1 |
| 2012/0299966 A1* | 11/2012 | Kim | H02J 17/00 345/660 |
| 2013/0214744 A1* | 8/2013 | Kang | H02J 7/025 320/162 |
| 2013/0335037 A1* | 12/2013 | Park | H04B 5/00 320/162 |
| 2014/0046707 A1* | 2/2014 | Hama | G06Q 10/20 705/5 |
| 2014/0145515 A1* | 5/2014 | Jung | H04B 5/0037 307/104 |
| 2014/0194099 A1* | 7/2014 | Park | H04B 5/0037 455/414.3 |
| 2015/0123606 A1* | 5/2015 | Tew | H02J 7/025 320/108 |

FOREIGN PATENT DOCUMENTS

| | | | | |
|---|---|---|---|---|
| JP | 2009-213295 A | 9/2009 | | |
| JP | 2009-261156 A | 11/2009 | | |
| JP | 2010-130729 A | 6/2010 | | |
| JP | 2010-162185 A | 7/2010 | | |
| JP | 2010-233826 A | 10/2010 | | |
| JP | 2011-244624 A | 12/2011 | | |
| JP | 2013-523070 A | 6/2013 | | |
| KR | 10-2011-0037999 A | 4/2011 | | |
| KR | 10-2012-0023839 A | 3/2012 | | |
| KR | 10-2012-0051320 A | 5/2012 | | |
| KR | WO 2012169861 A2 * | 12/2012 | | H02J 17/00 |
| WO | 2011/112010 A2 | 9/2011 | | |
| WO | 2012/140826 A1 | 3/2012 | | |

* cited by examiner

METHOD AND APPARATUS FOR DISPLAYING INFORMATION ABOUT WIRELESS CHARGING PAD IN ELECTRONIC DEVICE

CROSS-REFERENCE TO RELATED APPLICATION(S)

This application claims the benefit under 35 U.S.C. §119 (a) of a Korean patent application filed on Jan. 8, 2013 in the Korean Intellectual Property Office and assigned Serial number 10-2013-0002157, the entire disclosure of which is hereby incorporated by reference.

TECHNICAL FIELD

The present disclosure relates to wireless charging.

BACKGROUND

Each mobile terminal such as a mobile phone and smart phone provides various functions, such as a wireless Internet function, an electronic scheduler function, a multimedia photographing and reproduction function, a game function, and a digital broadcasting function, in addition to a basic communication function. Because each of these mobile terminals has a battery generally to allow for portability from a fixed power source, it is necessary to charge the battery periodically. In general, a wire charging method using a cable to charge the battery is most common. However, recently, as a Wireless Power Transfer (WPT) technology has been developed. A wireless charging device, which may wirelessly charge a battery, has been commercialized and come into wide use.

The WPT technology is classified into an electromagnetic induction type and an electronic resonance type. There is no direct contact of electrodes in the electromagnetic induction type. However, if a transmitting side and a receiving side must be very close, they may transmit and receive power. Accordingly, if the transmitting side (e.g., generally, referred to as a wireless charging pad) for transmitting energy and the receiving side (e.g., an electronic device such as a smart phone) for receiving energy must come in contact with each other, the receiving side may be charged. On the other hand, the electromagnetic resonance type is a method of supplying power to an electronic device which is spaced apart from a power source at a certain distance. Accordingly, although a transmitting side and a receiving side do not come in contact with each other, the receiving side may be charged.

On the other hand, if a user of an electronic device moves to a specific place (home or office), he or she recognizes only that the electronic device is wirelessly charged in the specific place where he or she knows of the location of a wireless charging pads and does not receive information about a wireless charging pads in other non-specific locations.

Because a distance between the wireless charging pad and an electronic device using a wireless charging type will increase in the future through the use of electromagnetic resonance wireless charging, there is a strong possibility that the user will use wireless charging in public places. In this environment, if information about the wireless charging pad is not provided to the user through the electronic device, it will be difficult for him or her to recognize a position of the wireless charging pad. Also, because information about the wireless charging efficiency of wireless charging pads in relation to the electronic device is not provided to the user, although the wireless charging efficiency may be low, the user may not properly adjust the correspondence between wireless charging pads and the electronic device to increase the wireless efficiency. For example, because wire charging efficiency is lower than wireless charging efficiency, when a battery consumption amount is less than a wireless charging amount, a power source of the electronic device may be turned off while the electronic device is wirelessly charged. Also, it may be difficult for the user to recognize whether the electronic device is being wirelessly charged.

As described above, because information about the wireless charging pad is not provided to the electronic device, the user of the electronic device may not recognize a position of the wireless charging pad. Accordingly, although the user finds the position of the wireless charging pad, it is difficult for him or her to ascertain efficiency of wireless charging.

Therefore, a method and apparatus for visually providing information about the wireless charging pad to the user and efficiently and wirelessly charging the electronic device is provided.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for displaying information about a wireless charging pad in an electronic device.

Another aspect of the present disclosure is to provide a method and apparatus for allowing a user to find a position of a wireless charging pad easily and providing information about the wireless charging pad to him or her such that he or she copes with an environment in which a wireless charging amount is less than a battery consumption amount.

In accordance with an aspect of the present disclosure, a method of displaying information about a plurality of wireless charging pads in an electronic device is provided. The method includes receiving information about the plurality of wireless charging pads and displaying the information about the plurality of wireless charging pads on a screen of the electronic device.

In accordance with another aspect of the present disclosure, a method of displaying information about a wireless charging pad in an electronic device is provided. The method includes receiving information about a first direction for which one side surface of the wireless charging pad heads from a specific device and comparing the first direction of the wireless charging pad with a second direction for which one side surface of the electronic device heads and displaying a third direction of the electronic device such that the third direction is a direction that obtains a maximum wireless charging efficiency.

In accordance with another aspect of the present disclosure, a method of displaying information about a wireless charging pad in an electronic device is provided. The method includes connecting to the wireless charging pad and starting wireless charging, calculating wireless charging efficiency while starting the wireless charging, and outputting a result corresponding to the calculated wireless charging efficiency.

In accordance with another aspect of the present disclosure, an electronic device is provided. The electronic device includes one or more processors, a memory, and one or more programs, each of the one or more programs which is stored in the memory and is configured to be executed by the one or more processors, wherein each of the one or more programs, when executed by the one or more processors, includes an instruction that receives information about a plurality of wireless charging pads and displays the information about the plurality of wireless charging pads on a screen of the electronic device.

In accordance with another aspect of the present disclosure, an electronic device is provided. The electronic device includes one or more processors, a memory, and one or more programs, each of the one or more programs which is stored in the memory and is configured to be executed by the one or more processors, wherein each of the one or more programs, when executed by the one or more processors, includes an instruction that receives information about a first direction for which one side surface of the wireless charging pad heads from a specific device, compares the first direction of the wireless charging pad with a second direction for which one side surface of the electronic device heads, and displays a third direction of the electronic device such that the third direction is a direction obtains a maximum wireless charging efficiency.

In accordance with another aspect of the present disclosure, an electronic device is provided. The electronic device includes one or more processors, a memory, and one or more programs, each of the one or more programs which is stored in the memory and is configured to be executed by the one or more processors, wherein each of the one or more programs, when executed by the one or more processors, includes an instruction that connects to the wireless charging pad, calculates a wireless charging efficiency while the electronic device performs wireless charging, and outputs a result corresponding to the calculated wireless charging efficiency.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method and apparatus for providing information about a wireless charging pad to an electronic device such that the electronic device efficiently performs wireless charging.

Hereinafter, a description will be given for a method and apparatus for displaying information about a wireless charging pad in an electronic device according to one embodiment of the present disclosure.

Figure 1:
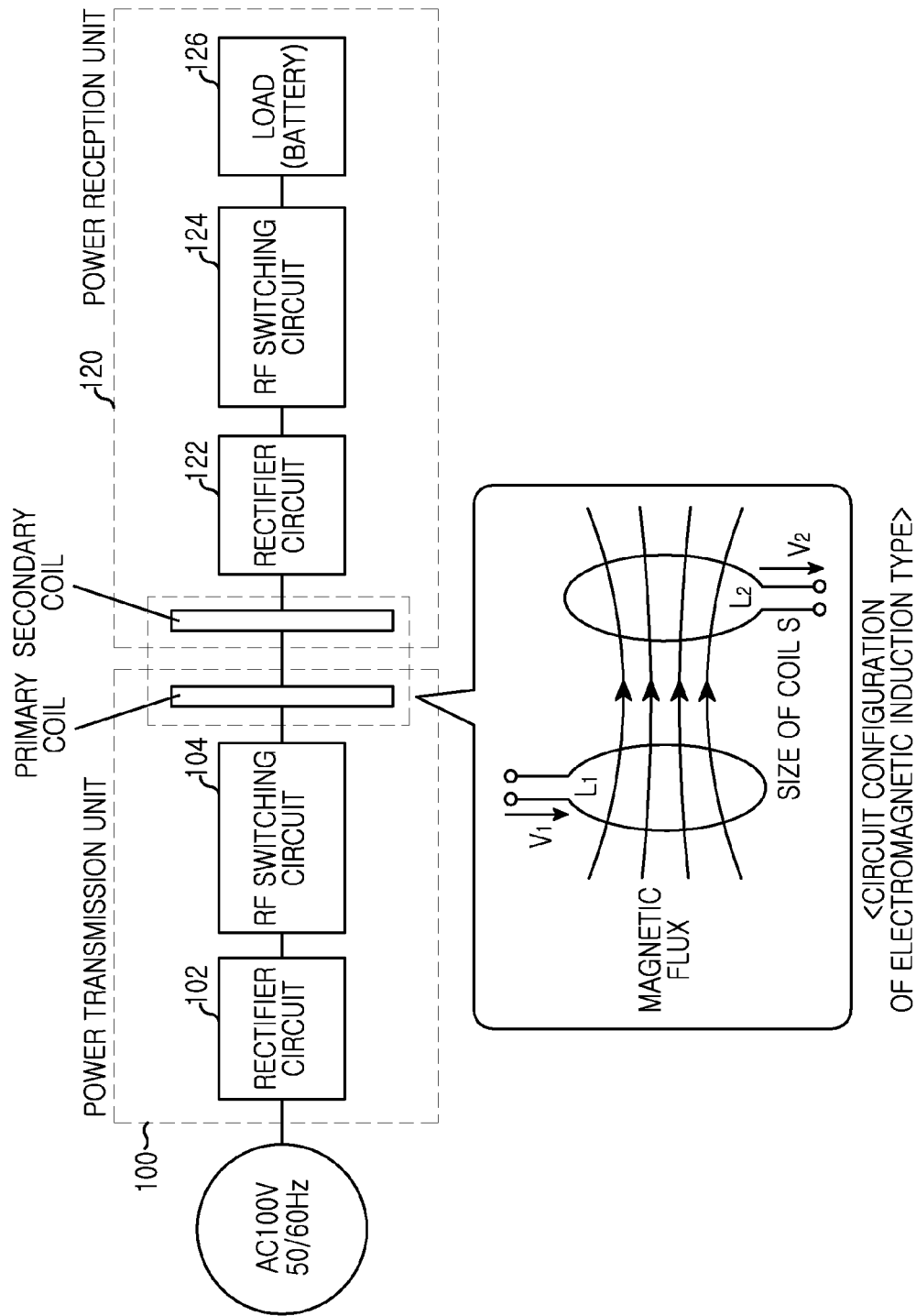
FIG. 1 is a block diagram illustrating a configuration of a wireless charging circuit of an electromagnetic induction type according to an embodiment of the present disclosure.

FIG. 1 is a block diagram illustrating configuration of a wireless charging circuit of an electromagnetic induction type according to an embodiment of the present disclosure.

After Alternating Current (AC) flows in one coil, when magnetic force lines are generated, the electromagnetic induction type is to use a principle in which the magnetic force lines induce voltage to a neighbor another coil. The principle is the same principle as a transformer which is used when stepping up or down voltage in a power device. Because a transformer for power uses 60 Hz frequencies, iron cores are inserted into coils to couple magnetic force lines well. However, two power transmission and reception coils are close to each other at about several centimeters in a non-contact WPT type to enhance energy transmission efficiency. In general, a usable transmission distance is about 10 centimeters. Because the usable transmission distance is used in an alignment range between inductive coil antennas for electromagnetic induction coupling, an application range is limited.

The electromagnetic induction type is short in a transmission distance. However, the electromagnetic induction type may correspond to terminals of various output types. As the electromagnetic induction type is comparatively easy in technology, it has convenience of non-contact power. Accordingly, the electromagnetic induction type is very frequently used in electrical devices of small capacity and first progresses in a completion degree and standardization of technology in comparison with other types.

Referring to FIG. 1, in power transmission principle, a power transmission unit 100 generates Direct Current (DC) generated by a rectifier circuit 102 as a Radio Frequency (RF) signal by an RF switching circuit 104 and transmits the generated RF signal to a primary coil. At this time, an electromotive force is generated by inducing a generated AC magnetic flux to a secondary coil of a power reception unit 120. Herein, if the AC magnetic flux generated in the primary coil $L_1$ is supplied to the secondary coil $L_2$, an electromotive force $V_1$ is generated and power is then transmitted. That is, the power reception unit 120 converts the electromotive force $V_2$ supplied to the secondary coil into DC through a rectifier circuit 122. The power reception unit 120 generates the DC generated by the rectifier circuit 122 as an RF signal through an RF switching circuit 124 and transmits the generated RF signal to a load (battery) 126.

Figure 2:
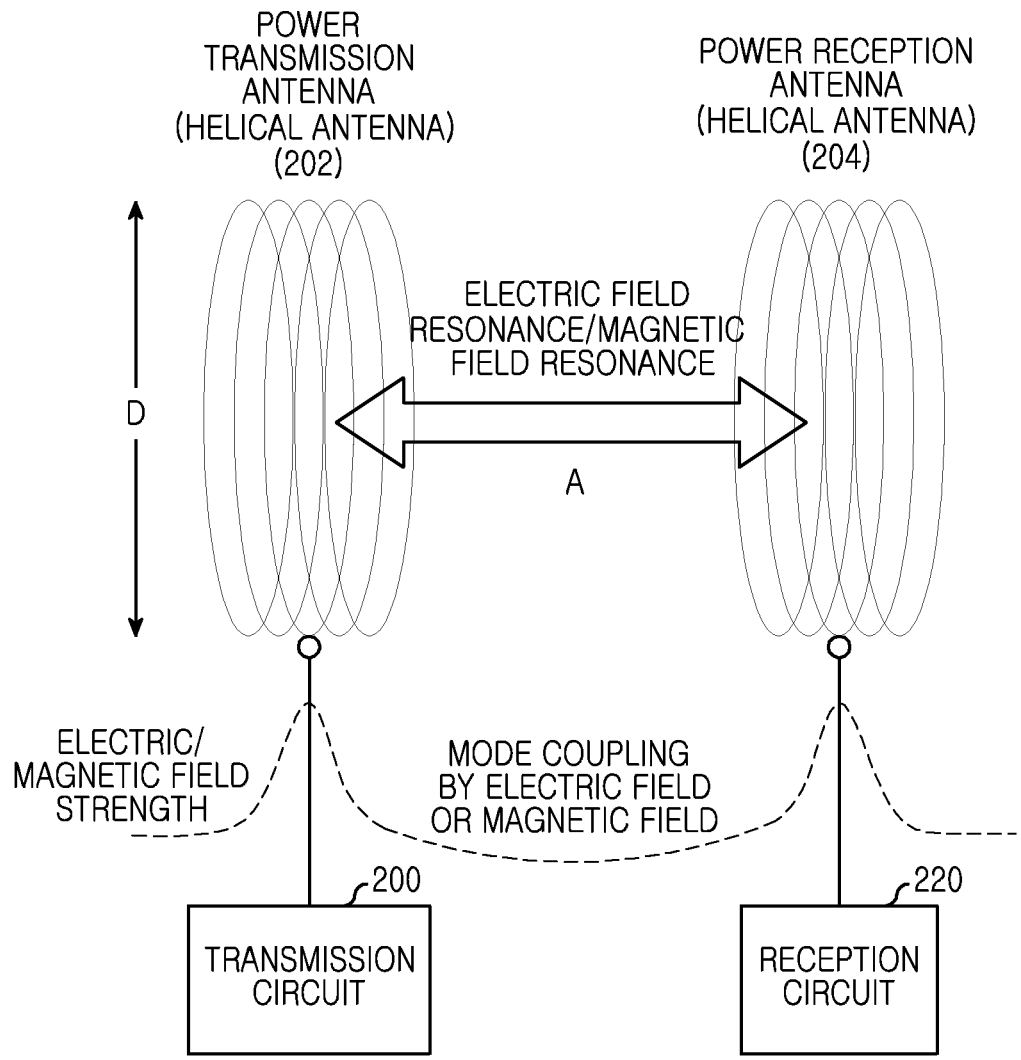
FIG. 2 is a block diagram illustrating a configuration of a wireless charging circuit of an electromagnetic resonance type according to an embodiment of the present disclosure.

FIG. 2 is a block diagram illustrating configuration of a wireless charging circuit of an electromagnetic resonance type according to an embodiment of the present disclosure.

The electromagnetic resonance type is to transmit non-radial electromagnetic wave energy between resonators which are spaced apart from each other. The electromagnetic resonance type is similar to an electromagnetic induction type, but may perform WPT of about 1 to 2 centimeters. In the electromagnetic resonance type, a resonance circuit is used to amplify and transmit energy. This resonance circuit may also couple energy using an electric field as well as a magnetic field.

Referring to FIG. 2, the electromagnetic resonance type has components such as a transmission circuit 200 and a reception circuit 220 like the electromagnetic induction type and uses a coil type such as power transmission antenna (helical antenna) 202 and power transmission antenna (helical antenna) 202. The electromagnetic resonance type uses resonance of an electric field and a magnetic field in an operation principle. In the electromagnetic resonance type, transmission efficiency is considerably influenced by a coil alignment condition like the electromagnetic induction type. However, in the electromagnetic resonance type, the alignment of coils is comparatively flexible in comparison with the electromagnetic induction type and a use range may be expanded using a relay type.

Difference between power transmission and reception efficiency may be determined by relation between a resonance strength Q between L and C and a coupling coefficient k between coils. Because a Q×K value which is the product of a Q value and a k value is high, efficiency is influenced by the Q×K value. Transmission efficiency of a magnetic/electric field resonance type is dependent on a transmission distance A and a coil diameter D. In the electromagnetic resonance type, because a Q value is low and a distance between coils is close in comparison with the electromagnetic induction type, a k value is heightened. On the other hand, a magnetic/electric field resonance type has a Q value of (100-1000), preferably around 1,000 and has a very high characteristic. For this reason, although a k value is low, around 0.001, in any distance degree, high efficiency may be implemented in the magnetic/electric field resonance type.

Hereinafter, the power transmission unit 100 shown in FIG. 1 and the transmission circuit 200 shown in FIG. 2 which radiates electromagnetic waves are referred to as a wireless charging pad.

Figure 3:
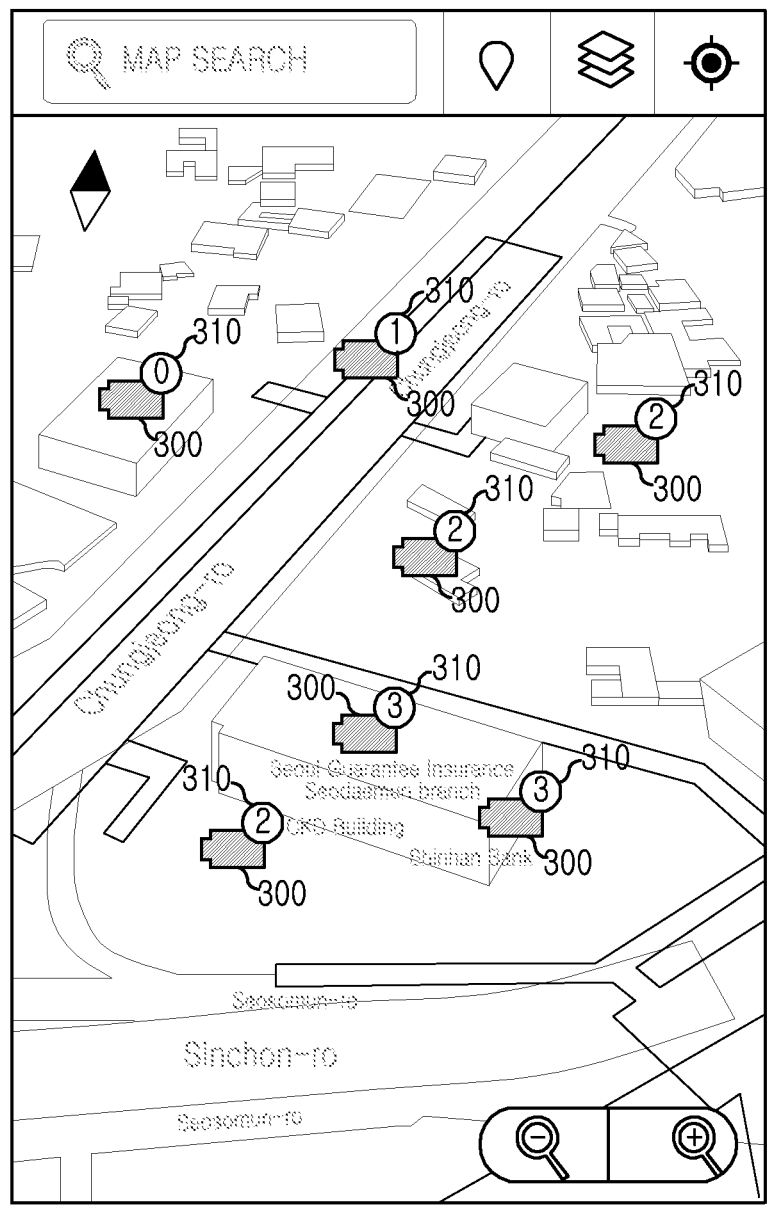
FIG. 3 is a screen for displaying information about a wireless charging pad in an electronic device according to an embodiment of the present disclosure.

FIG. 3 is a screen for displaying information about a wireless charging pad in an electronic device according to an embodiment of the present disclosure.

Referring to FIG. 3, a plurality of wireless charging pads 300 are displayed centered on current positions of electronic devices on a map through a map application installed in the electronic device. A number of electronic devices 310 which are connected with the wireless charging pads 300 and are wirelessly charged are displayed on the map. In order to achieve this, the electronic device 310 receives position information of the wireless charging pads 300 which exist centered on the current positions of the electronic devices 310 and information about the number of the electronic devices 310 which are connected with the wireless charging pads 300 and are wirelessly charged. Or, the electronic device 310 connects to each of wireless charging pads 300 through Peer to Peer (P2P) communication, and receives position information of each of the wireless charging pads 300 and information about the number of electronic devices 310 which are connected with the wireless charging pads 300 and are wirelessly charged from each of the wireless charging pads 300. Preferably, the P2P communication is, but is not limited to, based on a ZigBee communication type. The P2P communication may be also based on an Infrared Data Association (IrDA) type, a Bluetooth communication type, and a Near Field Communication (NFC) type.

For one example, the electronic device 310 may further receive information about a title of each of the wireless charging pads 300, charging efficiency of each of the wireless charging pads 300, and a wireless charging range of each of the wireless charging pads 300 and display the received information on its screen. For another example, the electronic device 310 may calculate and determine charging efficiency of each of the wireless charging pads 300 and a wireless charging range of each of the wireless charging pads 300.

On the other hand, wireless charging of an electromagnetic resonance type has degrees of freedom vertically (in a z-axis direction). Accordingly, when a direction between the wireless charging pad 300 and the electronic device 310 is vertically identical, there is maximum wireless charging efficiency. When a direction between the wireless charging pad 300 and the electronic device 310 is changed (that is, when the direction is not vertically identical), wireless charging efficiency is lowered.

Figure 4:
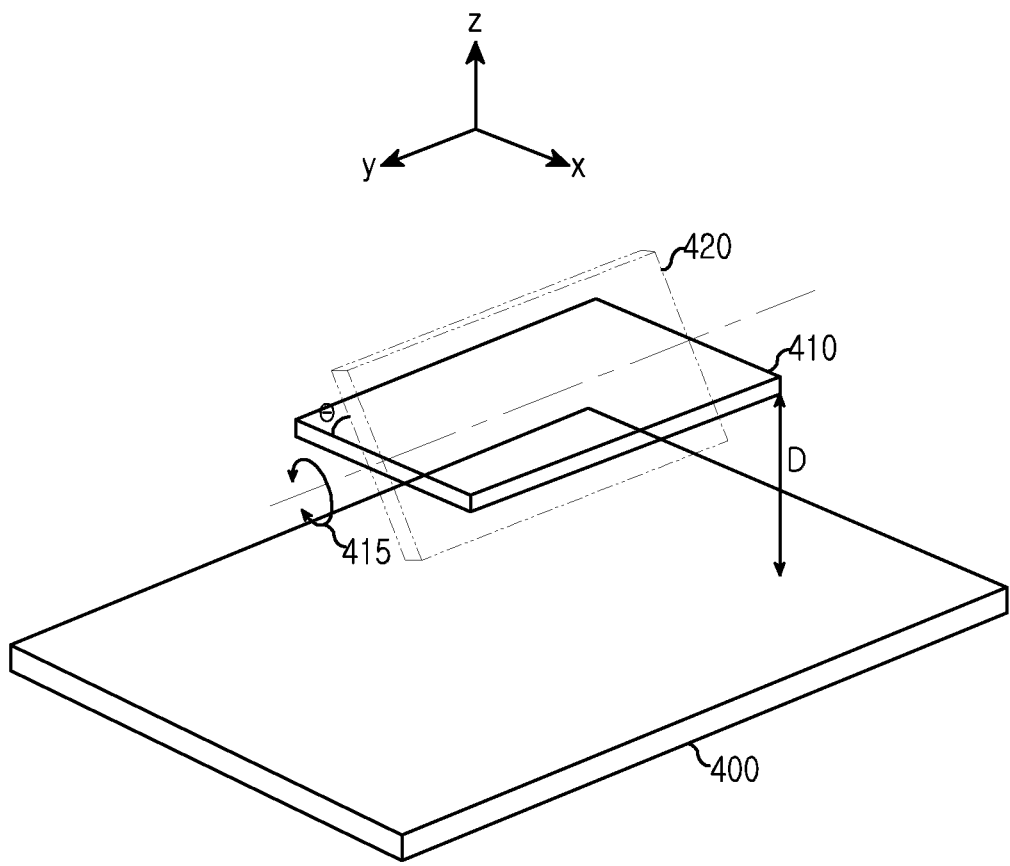
FIG. 4 illustrates relation between a direction between a wireless charging pad and an electronic device and wireless charging efficiency according to an embodiment of the present disclosure.
Figure 5A:
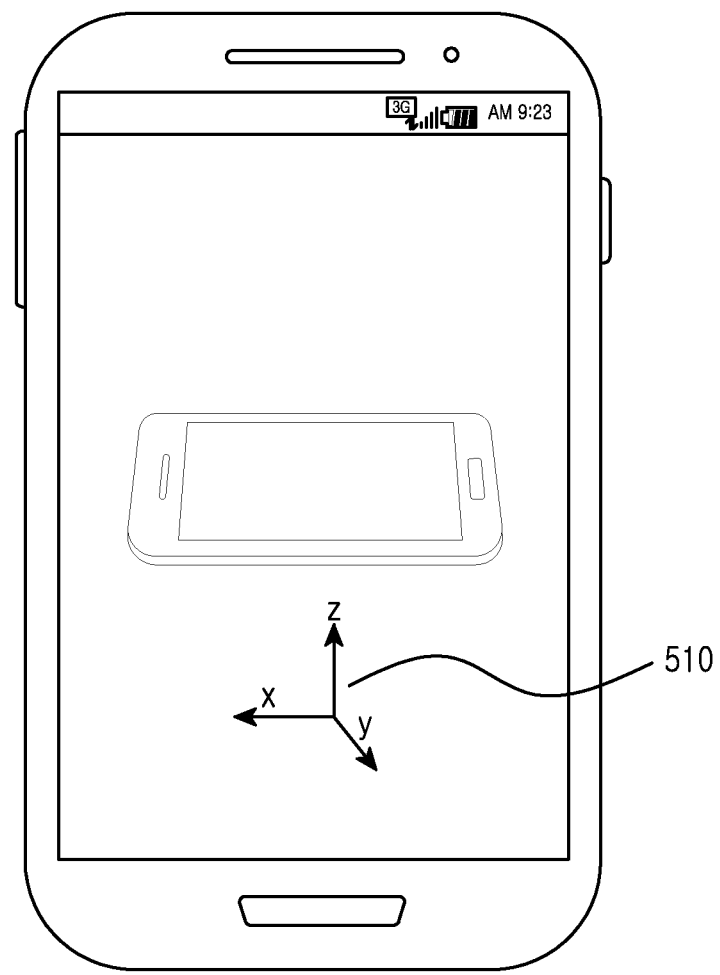
FIGS. 5A, 5B, 5C and 5D illustrate screens for indicating directions of an electronic device having the maximum wireless charging efficiency according to an embodiment of the present disclosure.
Figure 5B:
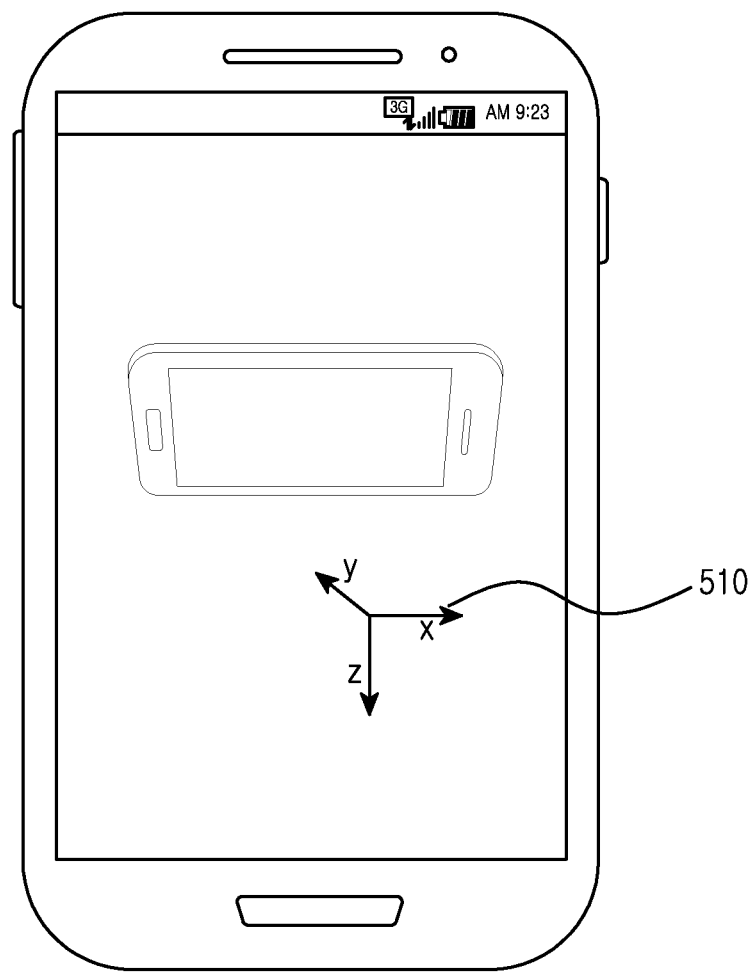
Figure 5C:
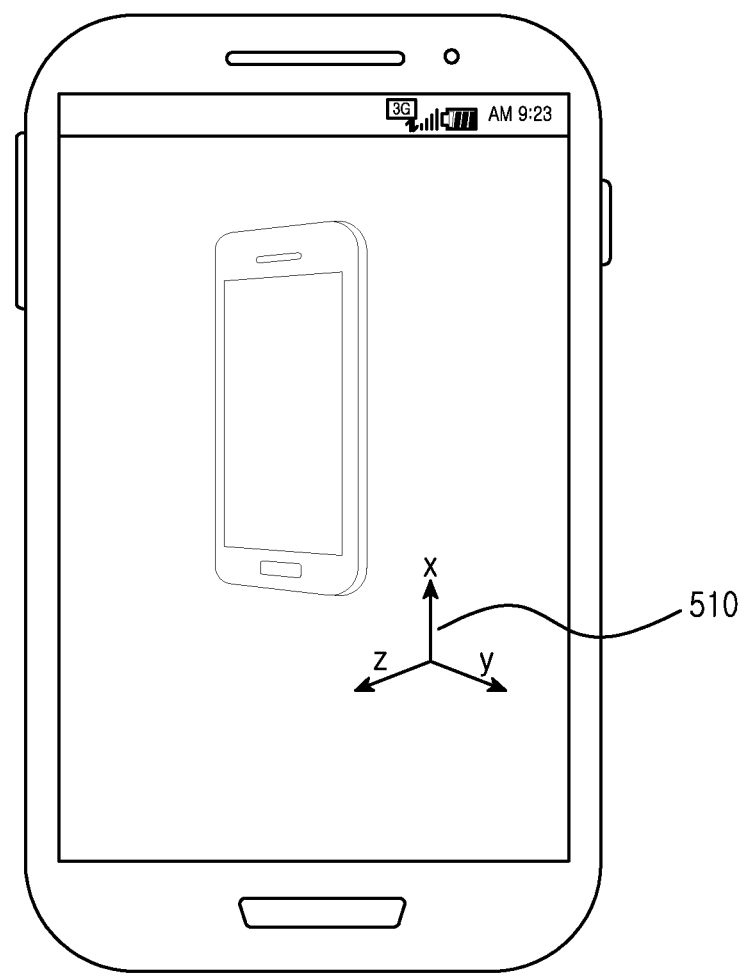
Figure 5D:
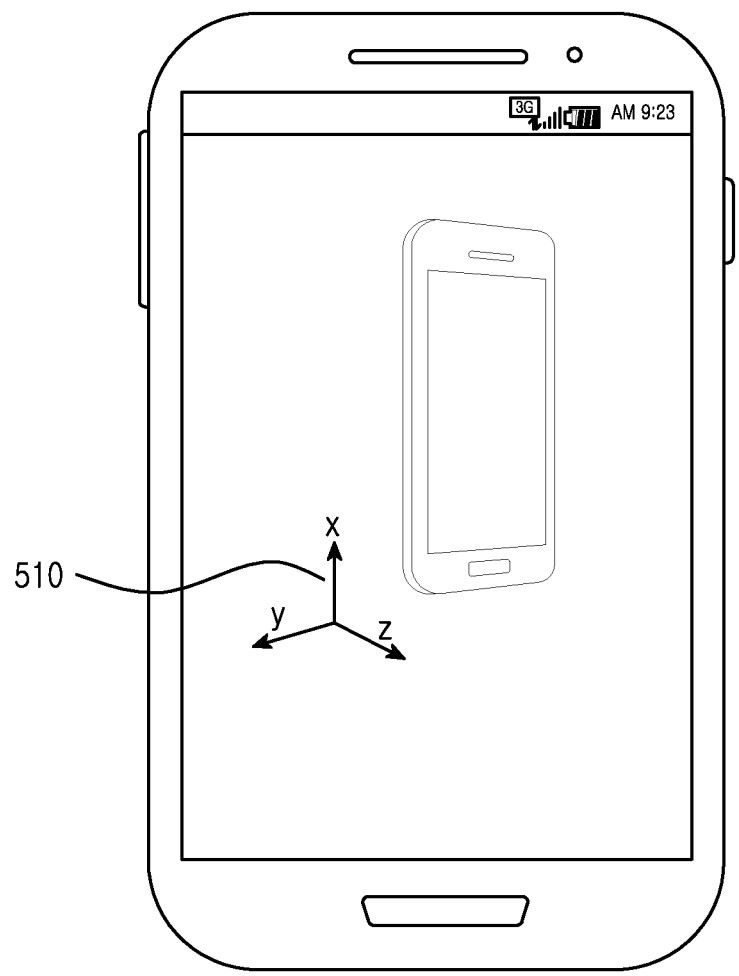

FIG. 4 illustrates relation between a direction between a wireless charging pad and an electronic device and wireless charging efficiency according to an embodiment of the present disclosure.

Referring to FIG. 4, when one side surface of a wireless charging pad 400 and one side surface of an electronic device 410 are vertically faced to each other at a distance D, there is maximum wireless charging efficiency. If the one side surface of the electronic device 410 is changed by an angle θ 415 to the plane 420 and crosses the one side surface of the wireless charging pad 400 at the angle θ 415, wireless charging efficiency is lower than that of when the one side surface of the wireless charging pad 400 and the one side surface of the electronic device 410 are vertical.

FIGS. 5A to 5D illustrate screens for indicating directions of an electronic device having the maximum wireless charging efficiency according to an embodiment of the present disclosure.

Referring to FIGS. 5A to 5D, it is assumed that a z direction on an xyz axis 510 is a direction in which one side surface of an electronic device and one side surface of a wireless charging pad are vertical. For one example, when wireless charging efficiency is less than or equal to a threshold value, the electronic device displays a direction in which the one side surface of the electronic device and one side surface of the wireless charging pad are vertical on its screen.

For another example, when the electronic device is ready to be wirelessly charged, it may display a direction in which one side surface of the electronic device and the one side surface of the wireless charging pad are vertical.

Figure 6A:
FIG. 6A illustrates a screen for performing a lamp operation according to wireless charging efficiency according to an embodiment of the present disclosure.

FIG. 6A illustrates a screen for performing a lamp operation according to wireless charging efficiency according to an embodiment of the present disclosure.

Referring to FIG. 6A, if a user of an electronic device executes applications (e.g., an Internet search application) installed in the electronic device while the electronic device is wirelessly charged, a battery of the electronic device may be consumed.

At this time, the electronic device may display different colors on a lamp 600 according to rechargeable efficiency determined by difference between the entire wireless charging amount of a wireless charging pad and a battery consumption amount of the electronic device to inform the rechargeable efficiency to the user. Herein, the entire wireless charging amount is determined as a ratio of an output power and an input power of the wireless charging pad.

For example, when the battery consumption amount is greater than the wireless charging amount (that is, when rechargeable efficiency is greater than a minus threshold value), the color of lamp 600 is red. When the wireless charging amount is a little greater than the battery consumption amount (that is, when rechargeable efficiency is between a minus threshold value and a plus threshold value), the color of lamp 600 is orange. When the wireless charging amount is considerably greater than the battery consumption amount (that is, rechargeable efficiency is greater than a plus threshold value), the color of lamp 600 is green. In addition, rechargeable efficiency may be displayed as a percentage.

Figure 6B:
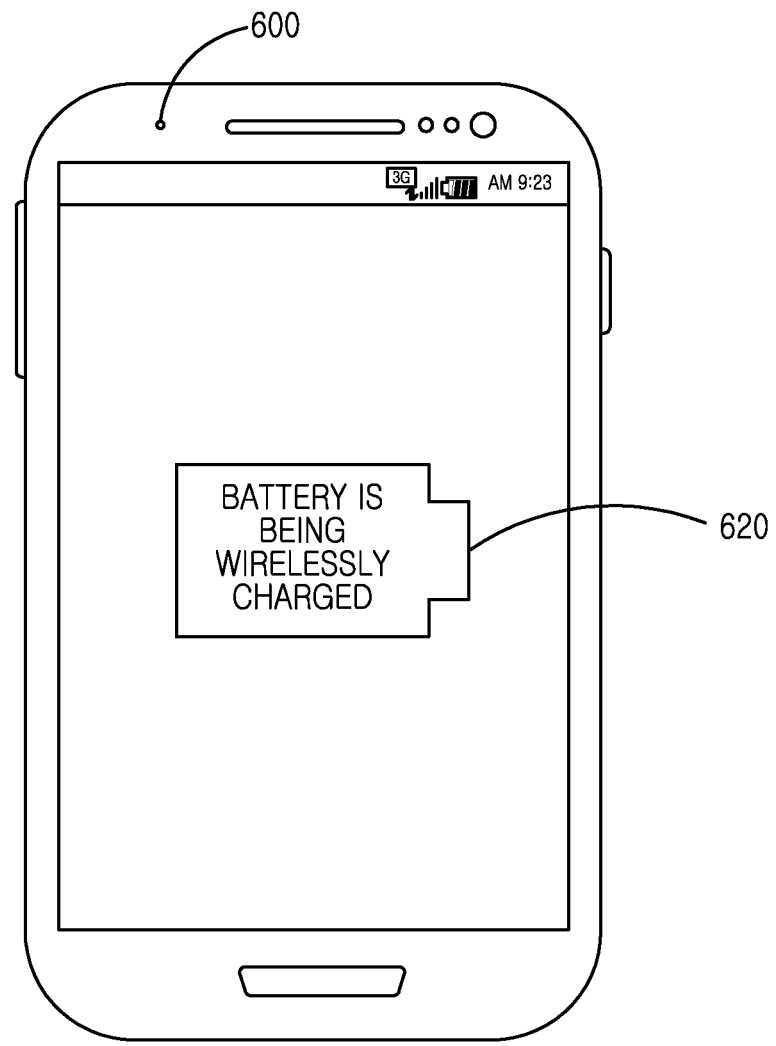
FIG. 6B illustrates a screen for performing a lamp operation according to wireless charging efficiency according to another embodiment of the present disclosure.

FIG. 6B illustrates a screen for performing a lamp operation according to wireless charging efficiency according to another embodiment of the present disclosure.

Referring to FIG. 6B, when an electronic device starts wireless charging (that is, when other applications are not executed by a user of the electronic device) a message 620 may be displayed on a display of the electronic device. When wireless charging efficiency is greater than a threshold value, the color of a lamp 600 is green. When the wireless charging efficiency is less than the threshold, the color of lamp 600 is red. In addition, the entire wireless charging efficiency may be selectively displayed as a percentage (not shown) in message 620.

Figure 7:
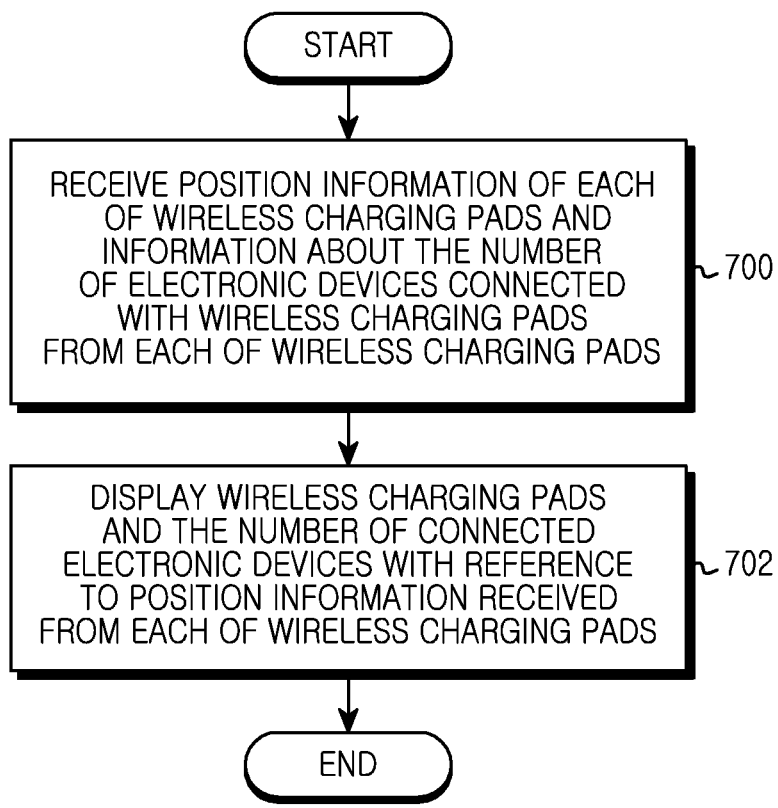
FIG. 7 is a flowchart illustrating a process of displaying information about a wireless charging pad in an electronic device according to an embodiment of the present disclosure.

FIG. 7 is a flowchart illustrating a process of displaying information about a wireless charging pad in an electronic device according to an embodiment of the present disclosure.

Referring to FIG. 7, the electronic device connects with each of a plurality of wireless charging pads which are in proximity to it through P2P communication and receives information about the plurality of wireless charging pads in operation 700. For one example, the information about the plurality of wireless charging pads includes a position of each of the wireless charging pads and the number of electronic devices connected with the wireless charging pads. For another example, the information about the plurality of wireless charging pads includes information about a title of each of the wireless charging pads, charging efficiency of each of the wireless charging pads, a wireless charging range of each of the wireless charging pads, etc. The charging efficiency of each of the wireless charging pads is determined as a ratio of an output power and an input power of each of the wireless charging pads. Preferably, the P2P communication is, but is not limited to, based on a ZigBee communication type. The P2P communication may be also based on an IrDA type, a Bluetooth communication type, and an NFC type.

Thereafter, the electronic device displays the information about the plurality of wireless charging pads in operation 702. For example, as shown in FIG. 3, the electronic device executes a specific application like a map application and displays a plurality of wireless charging pads and the number of electronic devices which are connected with the plurality of wireless charging pads and are wirelessly charged on its map.

Thereafter, the electronic device ends the algorithm of FIG. 7.

Figure 8:
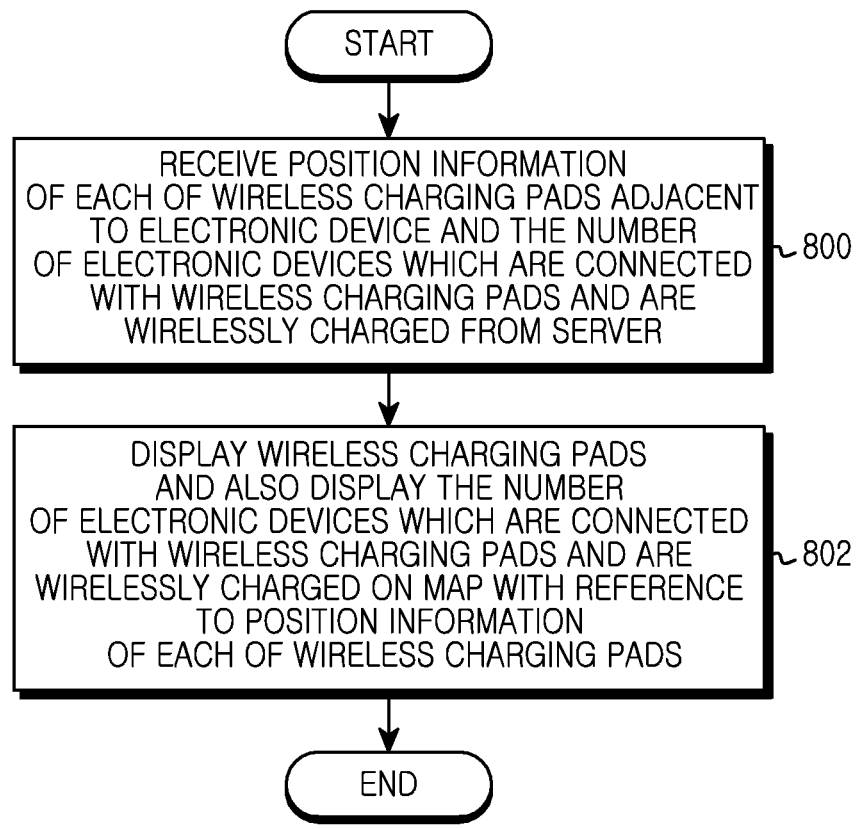
FIG. 8 is a flowchart illustrating a process of displaying information about a wireless charging pad in an electronic device according to another embodiment of the present disclosure.

FIG. 8 is a flowchart illustrating a process of displaying information about a wireless charging pad in an electronic device according to another embodiment of the present disclosure.

Referring to FIG. 8, the electronic device requests a specific server to transmit information about a plurality of wireless charging pads and receives the requested information through P2P communication in operation 800. For one example, the information about the plurality of wireless charging pads includes a position of each of the wireless charging pads and the number of electronic devices connected with the wireless charging pads. For another example, the information about the plurality of wireless charging pads includes information about a title of each of the wireless charging pads, charging efficiency of each of the wireless charging pads, a wireless charging range of each of the wireless charging pads, etc. The charging efficiency of each of the wireless charging pads is determined as a ratio of an output power and an input power of each of the wireless charging pads.

Preferably, the server provides information about wireless charging pads which exist centered on a position where the electronic device is located to the electronic device, according to a movement position of the electronic device, that is, according to handover of the electronic device.

Preferably, the P2P communication is, but is not limited to, based on a ZigBee communication type. The P2P communication may be also based on an IrDA type, a Bluetooth communication type, and an NFC type.

Also, the electronic device may receive only information about wireless charging pads which exist in proximity to its position by providing its position information to the specific server when requesting the specific server to transmit the information about the plurality of wireless charging pads.

Thereafter, the electronic device displays the information about the plurality of wireless charging pads in operation 802. For example, as shown in FIG. 3, the electronic device executes a specific application like a map application and displays a plurality of wireless charging pads and the number of electronic devices which are connected with the plurality of wireless charging pads and are wirelessly charged on its map.

Thereafter, the electronic device ends the algorithm of FIG. 8.

Figure 9:
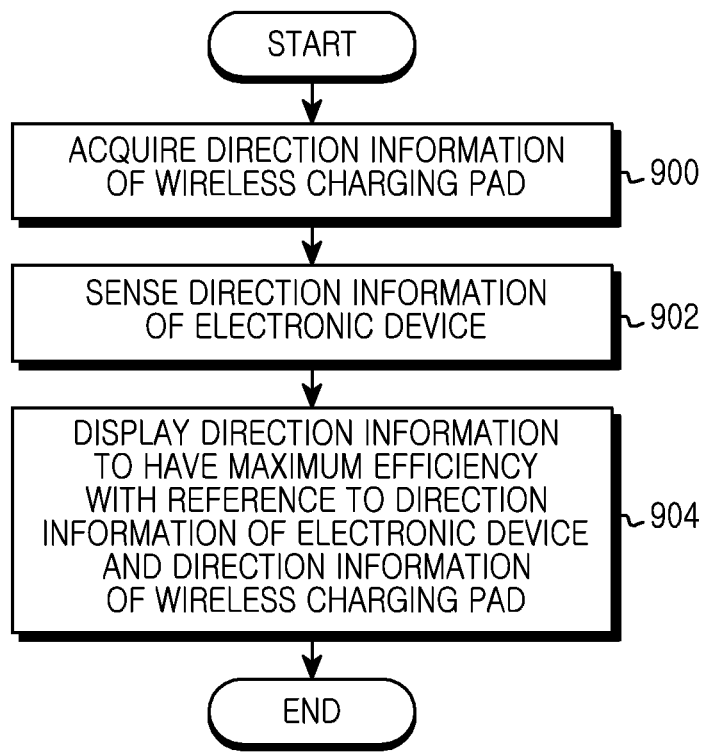
FIG. 9 is a flowchart illustrating a process of indicating a direction of an electronic device having the maximum wireless efficiency according to an embodiment of the present disclosure.

FIG. 9 is a flowchart illustrating a process of indicating a direction of an electronic device having the maximum wireless efficiency according to an embodiment of the present disclosure.

Referring to FIG. 9, the electronic device acquires direction information of a corresponding wireless charging pad from a server or the corresponding wireless charging pad in operation 900. That is, the electronic device receives information about a first direction for which one side surface of the corresponding wireless charging pad heads.

Thereafter, the electronic device senses a direction information for which its front or rear surface of the electronic device heads in operation 902.

The process of operation 900 and the process of operation 902 are successively performed or are independently performed in parallel.

Thereafter, as shown in FIGS. 5A to 5D, the electronic device displays its third direction on its screen such that the third direction is a direction for obtaining the maximum wireless charging efficiency with reference to the first direction of the corresponding wireless charging pad and the second direction in operation 904. That is, the third direction of the electronic device is a direction in which the first direction of the wireless charging pad and one side surface of the electronic device form a right angle.

Preferably, when wireless charging efficiency of the electronic device is lower than a threshold value, the electronic device compares the first direction of the corresponding wireless charging pad with the second direction and, as shown in FIGS. 5A to 5D, displays the third direction on the screen such that the third direction is a direction for obtaining the maximum wireless charging efficiency.

Thereafter, the electronic device ends the algorithm of FIG. 9.

Figure 10:
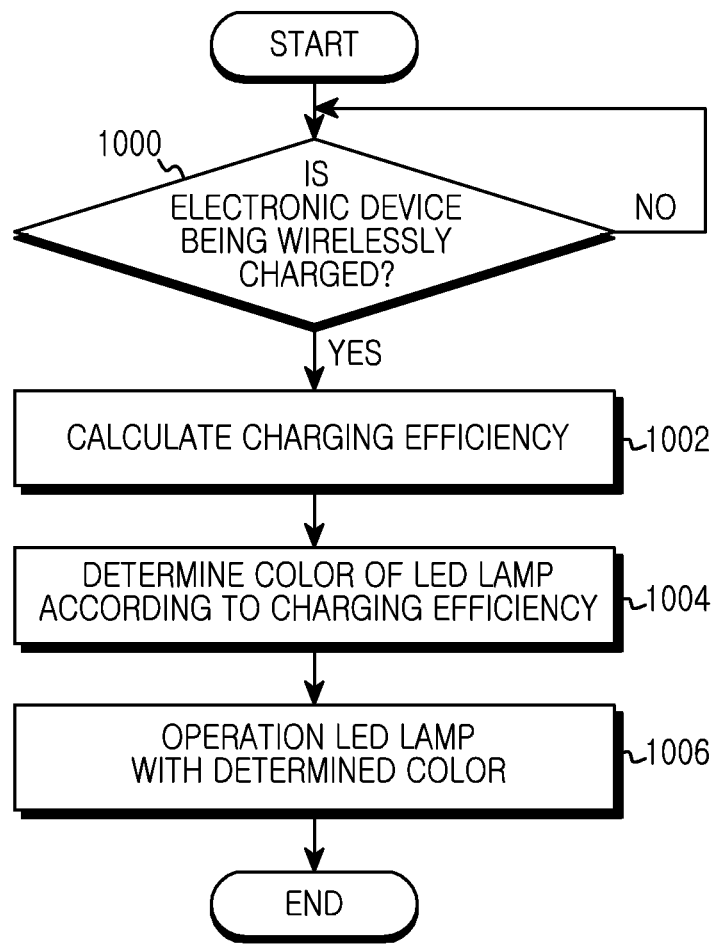
FIG. 10 is a flowchart illustrating a process of controlling a lamp operation according to wireless efficiency according to an embodiment of the present disclosure.

FIG. 10 is a flowchart illustrating a process of controlling a lamp operation according to wireless efficiency according to an embodiment of the present disclosure.

Referring to FIG. 10, an electronic device determines whether it is being wirelessly charged in operation 1000. When the electronic device is being wirelessly charged ('YES'), in operation 1000, it proceeds to operation 1002. Otherwise, the electronic device continues to determine whether it is being wirelessly charged ('NO'), in operation 1000. In operation 1002 calculate the entire wireless charging efficiency or rechargeable efficiency. The entire wireless charging efficiency is determined by a ratio of an output power and an input power of a wireless charging pad. The rechargeable efficiency is determined by difference between the entire wireless charging amount of a wireless charging pad and a battery consumption amount of the electronic device.

Thereafter, the electronic device determines a lamp color according to the entire wireless charging efficiency or the rechargeable efficiency in operation 1004. The electronic device operates a lamp with the determined lamp color in operation 1006.

For example, when the entire wireless charging efficiency is greater than or equal to a threshold, the color of the lamp is green. When the entire wireless charging efficiency is less than the threshold value, the color of the lamp cred. In addition, the entire wireless charging efficiency may be selectively displayed as a percentage.

On the other hand, although the electronic device is being wirelessly charged, a user of the electronic device may execute applications installed therein and consume its battery.

Accordingly, the electronic device displays a lamp color according to the rechargeable efficiency determined by the difference between the wireless charging amount of the wireless charging pad and the battery consumption amount to inform the rechargeable efficiency to the user.

For example, when the battery consumption amount is greater than the wireless charging amount, a color of the lamp is red. When the wireless charging amount is a little greater than the battery consumption amount, a color of the lamp is orange. When the wireless charging amount is considerably greater than the battery consumption amount, a color of the lamp is green.

Thereafter, the electronic device ends the algorithm of FIG. 10.

In another embodiment of the present disclosure, when the entire wireless charging efficiency or the rechargeable efficiency is less than or equal to a threshold value, the electronic device may notify the charging efficiency to the user through vibration.

Figure 11:
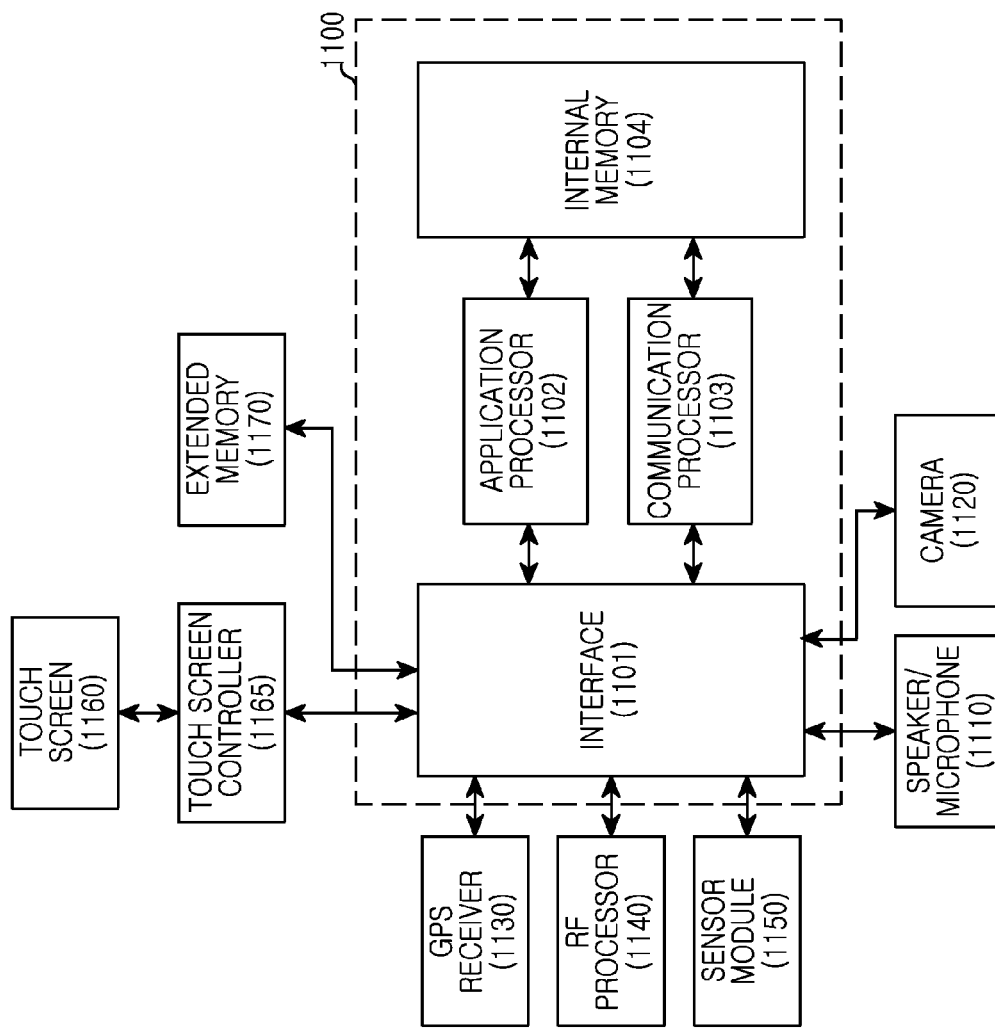
FIG. 11 is a block diagram illustrating configuration of an electronic device according to an embodiment of the present disclosure.

FIG. 11 is a block diagram illustrating configuration of an electronic device according to an embodiment of the present disclosure.

The electronic device may be a portable electronic device. The electronic device may be any one of apparatuses, such as a portable terminal, a mobile terminal, a mobile pad, a media player, a tablet computer, a handheld computer, and a Personal Digital Assistant (PDA). Also, the electronic device may be a certain portable electronic device including a device in which two or more functions are combined among these apparatuses.

Referring to FIG. 11, the electronic device includes a controller 1100, a speaker/microphone 1110, a camera 1120, a Global Positioning System (GPS) receiver 1130, an RF processor 1140, a sensor module 1150, a touch screen 1160, a touch screen controller 1165, and an extended memory 1170.

The controller 1100 may include an interface 1101, one or more processors such as an application processor 1102 and a communication processor 1103, and an internal memory 1104. In some cases, the whole controller 1100 is referred to as a processor. The interface 1101, the application processor 1102, the communication processor 1103, and the internal memory 1104 may be separately configured or be integrated in one or more Integrated Circuits (ICs).

The application processor 1102 executes several software programs and performs several functions for the electronic device. Also, the communication processor 1103 performs process and control for voice communication and data communication. Also, in addition to this normal function, the application processor 1102 and the communication processor 1103 play a role in executing a specific software module (instruction set) stored in the extended memory 1170 or the internal memory 1104 and performing several specific functions corresponding to the software module. That is, the application processor 1102 and the communication processor 1103 interwork with the software modules stored in the extended memory 1170 or the internal memory 1104 and perform the method of displaying information about a wireless charging pad according to one embodiment of the present disclosure.

In an embodiment of the present disclosure, the application processor 1102 connects with each of a plurality of wireless charging pads which are in proximity to it through P2P communication, receives information about the plurality of wireless charging pads, and displays the information about the plurality of wireless charging pads. For one example, the information about the wireless charging pads includes a position of each of the wireless charging pads and the number of electronic devices which are connected with the wireless charging pads and are wirelessly charged. For another example, the information about the wireless charging pads includes information about a title of each of the wireless charging pads, charging efficiency of each of the wireless charging pads, a wireless charging range of each of the wireless charging pads, etc. The charging efficiency of each of the wireless charging pads is determined by a ratio of an output power and an input power of each of the wireless charging pads.

For example, as shown in FIG. 3, the application processor 1102 executes a specific application like a map application, and displays a plurality of wireless charging pads and the number of electronic devices which are connected with the plurality of wireless charging pads and are wirelessly charged.

In another embodiment of the present disclosure, the application processor 1102 requests a specific server to transmit information about a plurality of wireless charging pads, receives the requested information, and displays the information about the plurality of wireless charging pads. For one example, the information about the wireless charging pads includes a position of each of the wireless charging pads and the number of electronic devices which are connected with the wireless charging pads and are wirelessly charged. For another example, the information about the wireless charging pads includes information about a title of each of the wireless charging pads, charging efficiency of each of the wireless charging pads, a wireless charging range of each of the wireless charging pads, etc. The charging efficiency of each of the wireless charging pads is determined by a ratio of an output power and an input power of each of the wireless charging pads.

On the other hand, the application processor 1102 may receive only information about wireless charging pads which exist in proximity to a position of the electronic device by providing position information of the electronic device to the specific server when requesting the specific server to transmit the information about the plurality of wireless charging pads.

In another embodiment of the present disclosure, the application processor 1102 acquires direction information of a corresponding wireless charging pad from a server or the corresponding wireless charging pad. That is, the application processor 1102 receives information about a first direction for which one side surface of the corresponding wireless charging pad heads, measures a second direction for which a front or rear surface of the electronic device heads, and, as shown in FIGS. 5A to 5D, displays a third direction of the electronic device on a screen of the electronic device such that the third direction is a direction for obtaining the maximum wireless charging efficiency with reference to the first direction of the corresponding wireless charging pad and the second direction of the electronic device. The third direction of the electronic device is a direction in which the first direction of the wireless charging pad and one side surface of the electronic device form a right angle.

Preferably, for one example, when wireless charging efficiency of the electronic device is lower than a threshold value, the application processor 1102 compares the first direction of the corresponding wireless charging pad with the second direction of the electronic device and, as shown in FIGS. 5A to 5D, displays the third direction of the electronic device on the screen such that the third direction is a direction for obtaining the maximum wireless charging efficiency. For another example, when the electronic device starts wireless charging, the application processor 1102 may compare the first direction of the corresponding wireless charging pad with the second direction of the electronic device and, as shown in FIGS. 5A to 5D, display the third direction of the electronic device such that the third direction is a direction for obtaining the maximum wireless charging efficiency.

In another embodiment of the present disclosure, the application processor 1102 determines whether the electronic device is being wirelessly charged, calculates the entire wireless charging efficiency or rechargeable efficiency when the electronic device is being wirelessly charged, determines a lamp color according to the entire wireless charging efficiency or the rechargeable efficiency, and operates a lamp with the determined lamp color. The entire wireless charging efficiency is determined by a ratio of an output power and an input power of a wireless charging pad. The rechargeable efficiency is determined by difference between the entire wireless charging amount of a wireless charging pad and a battery consumption amount of the electronic device.

For example, when the entire wireless charging efficiency is greater than or equal to a threshold value, a color of the lamp is green. When the entire wireless charging efficiency is less than the threshold value, the color of the lamp is red. In addition, the entire wireless charging efficiency may be selectively displayed as a percentage.

Or, when the battery consumption amount is greater than the wireless charging amount, a color of the lamp is red. When the wireless charging amount is a little greater than the battery consumption amount, a color of the lamp is orange. When the wireless charging amount is considerably greater than the battery consumption amount, a color of the lamp is green.

On the other hand, another processor (not shown) may include one or more data processors, an image processor, or a codec. The one or more data processors, the image processor, or the codec may be separately configured. Also, the one or more data processors, the image processor, or the codec may be configured as several processors which perform different functions. The interface 1101 connects to the touch screen controller 1165 of the electronic device with the extended memory 1170.

The sensor module 1150 may connect to the interface 1101 and perform several functions. For example, a motion sensor and an optical sensor may connect to the interface 1101, sense motion of the electronic device, and sense light from the outside. Furthermore, a position measurement system and other sensors such as a temperature sensor, a bio-sensor, etc. may connect to the interface 1101 and perform related functions.

The camera 1120 may be combined to the sensor module 1150 through the interface 1101 and perform a camera function like a photo and video clip recording function.

The RF processor 1140 performs a communication function. For example, the RF processor 1140 converts an RF signal into a baseband signal and provides the baseband signal to the communication processor 1103 under control of the communication processor 1103. The RF processor 1140 converts a baseband signal from the communication processor 1103 into an RF signal and transmits the RF signal under control of the communication processor 1103. Herein, the communication processor 1103 processes a baseband signal using various communication schemes. The communication scheme may include, but is not limited to, at least one of a Global System for Mobile communication (GSM) communication scheme, an Enhanced Data GSM Environment (EDGE) communication scheme, a Code Division Multiple Access (CDMA) communication scheme, a W-CDMA communication scheme, a Long Term Evolution (LTE) communication scheme, an Orthogonal Frequency Division Multiple Access (OFDMA) communication scheme, a Wireless Fidelity (Wi-Fi) communication scheme, a WiMax communication scheme, a Bluetooth communication scheme, a Zigbee communication scheme, an IrDA communication scheme, or/and an NFC communication scheme.

The speaker/microphone 1110 may be responsible for inputting and outputting an audio stream, such as a voice recognition function, a voice copy function, a digital recording function, and a phone call function. That is, the speaker/microphone 1110 converts a voice signal into an electric signal or converts an electric signal into a voice signal. Although it is not shown in FIG. 11, an attachable and detachable earphone, headphone, or headset may connect to the electronic device through an external port.

The touch screen controller 1165 may be coupled to the touch screen 1160. The touch screen 1160 and the touch screen controller 1165 may detect, but is not limited to, contact and motion or stop of them using not only capacitive, resistive, infrared ray, and surface acoustic wave technologies for determining one or more contact points with the touch screen 1160 but also a certain multi-touch sensing technology including other proximity sensor arrangement or other elements.

The touch screen 1160 provides an input/output interface between the electronic device and the user. That is, the touch screen 1160 transmits touch input of the user to the electronic device. Also, the touch screen 1160 is a medium for displaying output from the electronic device to the user. That is, the touch screen 1160 displays visual output to the user. This visual output has a text type, a graphic type, a video type, and a combined type of them.

The touch screen 1160 may be several displays. For example, the touch screen 1160 may be, but is not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The GPS receiver 1130 converts a signal received from an artificial satellite into information such as a position, a speed, and a time. For example, a distance between the satellite and the GPS receiver 1130 is calculated by multiplying the velocity of light by a signal arrival time. A position of the electronic device is measured by obtaining accurate positions and distances of three satellites and applying the obtained value to a well-known trilateration principle The extended memory 1170 or the internal memory 1104 may include a high-speed Random Access Memory (RAM) such as one or more magnetic storages, a non-volatile memory, one or more optical storages, and/or a flash memory (e.g., a NAND flash memory or a NOR flash memory).

The extended memory 1170 or the internal memory 1104 stores software components. The software components include an Operating System (OS) software module, a communication software module, a graphic software module, a user interface software module, a CODEC software module, a camera software module, one or more application software modules, etc. Also, the modules which are the software components may be expressed in a set of instructions. Accordingly, the modules are expressed in an instruction set. Also, the modules are expressed in programs.

The OS software module includes several software components for controlling a general system operation. For example, control of this general system operation means memory management and control, storage hardware (device) control and management, power control and management, etc. This OS software module also performs a function for smoothly communicating between several hardware components (devices) and software components (modules).

The communication software module may communicate with other electronic devices such as a computer, a server, and/or a portable terminal through the RF processor 1140. The communication software module is configured by a protocol structure corresponding to a corresponding communication scheme.

The graphic software module includes several software components for providing and displaying graphics on the touch screen 1160. The term "graphics" means that texts, webpages, icons, digital images, videos, animations, etc. are included.

The user interface software module includes several software components related to a user interface. The user interface software module includes contents about whether a state of a user interface is changed to any state, whether a state of a user interface is changed in any condition, etc.

The camera software module includes camera1-related software components which may perform camera-related processes and functions.

The application software module includes a browser function including a rendering engine, an email function, an instant message function, a word processing function, a keyboard emulation function, an address book function, a touch list function, a widget function, a Digital Right Management (DRM) function, a voice recognition function, a voice copy function, a position determining function, a location based service function, etc. The extended memory 1170 or the internal memory 1104 may include additional modules (instructions) in addition to the modules described above. Or, if necessary, the extended memory 1170 or the internal memory 1104 may not include some modules (instructions).

In accordance with an embodiment of the present disclosure, the application software module includes instructions (see, FIGS. 7 to 10) for adjusting a specific object in a webpage In an embodiment of the present disclosure, the application software module includes an instruction for connecting with each of a plurality of wireless charging pads which are in proximity to it through P2P communication, receiving information about the plurality of wireless charging pads, and displaying the information about the plurality of wireless charging pads. For one example, the information about the wireless charging pads includes a position of each of the wireless charging pads and the number of electronic devices which are connected with the wireless charging pads and are wirelessly charged. For another example, the information about the wireless charging pads includes information about a title of each of the wireless charging pads, charging efficiency of each of the wireless charging pads, a wireless charging range of each of the wireless charging pads, etc. The charging efficiency of each of the wireless charging pads is determined by a ratio of an output power and an input power of each of the wireless charging pads.

In another embodiment of the present disclosure, the application software module includes an instruction for requesting a specific server to transmit information about a plurality of wireless charging pads, receiving the requested information, and displaying the information about the plurality of wireless charging pads. For one example, the information about the wireless charging pads includes a position of each of the wireless charging pads and the number of electronic devices which are connected with the wireless charging pads and are wirelessly charged. For another example, the information about the wireless charging pads includes information about a title of each of the wireless charging pads, charging efficiency of each of the wireless charging pads, a wireless charging range of each of the wireless charging pads, etc. The charging efficiency of each of the wireless charging pads is determined by a ratio of an output power and an input power of each of the wireless charging pads.

On the other hand, the application software module may receive only information about wireless charging pads which exist in proximity to a position of the electronic device by providing position information of the electronic device to the specific server when requesting the specific server to transmit the information about the plurality of wireless charging pads.

In another embodiment of the present disclosure, the application software module includes an instruction for acquiring direction information of a corresponding wireless charging pad from a server or the corresponding wireless charging pad. That is, the application software module includes an instruction for receiving information about a first direction for which one side surface of the corresponding wireless charging pad heads, measuring a second direction for which a front or rear surface of the electronic device heads, and, as shown in FIGS. 5A to 5D, displaying a third direction of the electronic device on a screen of the electronic device such that the third direction is a direction for obtaining the maximum wireless charging efficiency with reference to the first direction of the corresponding wireless charging pad and the second direction of the electronic device. The third direction of the electronic device is a direction in which the first direction of the wireless charging pad and one side surface of the electronic device form a right angle.

Preferably, when wireless charging efficiency of the electronic device is lower than a threshold value, or when the electronic device starts wireless charging, the application software module compares the first direction of the corresponding wireless charging pad with the second direction of the electronic device and, as shown in FIGS. 5A to 5D, displays the third direction of the electronic device on the screen such that the third direction is a direction for obtaining the maximum wireless charging efficiency.

In another embodiment of the present disclosure, the application software module includes an instruction for determining whether the electronic device is being wirelessly charged, calculating the entire wireless charging efficiency or rechargeable efficiency when the electronic device is being wirelessly charged, determining a lamp color according to the entire wireless charging efficiency or the rechargeable efficiency, and operating a lamp with the determined lamp color. The entire wireless charging efficiency is determined by a ratio of an output power and an input power of a wireless charging pad. The rechargeable efficiency is determined by difference between the entire wireless charging amount of a wireless charging pad and a battery consumption amount of the electronic device.

For example, when the entire wireless charging efficiency is greater than or equal to a threshold value, a color of the lamp is green. When the entire wireless charging efficiency is less than the threshold value, the color of the lamp is red. In addition, the entire wireless charging efficiency may be selectively displayed as a percentage.

Or, when the battery consumption amount is greater than the wireless charging amount, a color of the lamp is red. When the wireless charging amount is a little greater than the battery consumption amount, a color of the lamp is orange. When the wireless charging amount is considerably greater than the battery consumption amount, a color of the lamp is green.

A variety of functions of the electronic device, which are described above or to be described later, may be executed by one or more streaming processing, hardware including an ASIC, software, and/or combination of them.

As described above, the electronic device according to embodiments of the present disclosure provides the information about the wireless charging pad to the user such that he or she easily find a position of the wireless charging pad.

Also, in an environment where wireless charging efficiency is lower than wire charging efficiency, the electronic device may visually display the information about the wireless charging pad to the user, provide a position having the maximum wireless charging efficiency while it is wirelessly charged, and provide a guide such that he or she performs suitable correspondence when it is wirelessly charged while he or she uses it.

It will be appreciated that embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement various embodiments of the present disclosure. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method displaying information about a wireless charging pad in an electronic device, the method comprising:
   connecting to the wireless charging pad and starting wireless charging;
   calculating a wireless charging efficiency while starting the wireless charging, the calculating of the wireless charging efficiency comprising comparing an orientation of the wireless charging pad with an orientation of a side surface of the electronic device; and
   outputting a result corresponding to the calculated wireless charging efficiency,
   wherein outputting the result comprises displaying an X-axis, Y-axis, and Z-axis with an orientation of the electronic device according to the X-axis, Y-axis, and Z-axis that obtains a maximum wireless charging efficiency.

2. The method of claim 1,
   wherein the wireless charging efficiency is further calculated by a difference between an entire wireless charging efficiency and a battery consumption amount of the electronic device, and
   wherein the entire wireless charging efficiency is further calculated by a ratio of an output power and an input power of the wireless charging pad.

3. The method of claim 1, wherein the outputting of the result corresponding to the calculated wireless charging efficiency comprises:
   determining a lamp color according to the wireless charging efficiency; and
   operating a lamp to emit the lamp color.

4. The method of claim 1, wherein the output of the result corresponding to the calculated wireless charging efficiency comprises:
   converting the result corresponding to the calculated wireless charging efficiency into an indicator, a text, or a voice; and
   outputting the converted indicator, the text, or the voice.

5. An electronic device comprising:
   one or more processors;
   a memory having one or more programs, each of the one or more programs being configured to be executed by the one or more processors,
   wherein a program of the one or more programs, when executed by the one or more processors, includes instructions that:
   connect to the wireless charging pad,
   calculate a wireless charging efficiency while the electronic device performs wireless charging, and
   output a result corresponding to the calculated wireless charging efficiency,
   wherein the instruction that calculates the wireless charging efficiency includes an instruction that compares an orientation of the wireless charging pad with an orientation of one side surface of the electronic device, and
   wherein the instruction that outputs the result includes an instruction that displays an X-axis, Y-axis, and Z-axis with an orientation of the electronic device according to the X-axis, Y-axis, and Z-axis that obtains a maximum wireless charging efficiency.

6. The electronic device of claim 5,
   wherein the wireless charging efficiency is further determined by difference between an entire wireless charging efficiency and a battery consumption amount of the electronic device, and
   wherein the wireless charging efficiency is further determined by a ratio of an output power and an input power of the wireless charging pad.

7. The electronic device of claim 5, wherein the instruction that outputs the result corresponding to the calculated wireless charging efficiency includes an instruction that determines a lamp color according to the wireless charging efficiency and operates a lamp to emit the lamp color.

8. The electronic device of claim 5, wherein the instruction that outputs the result corresponding to the calculated wireless charging efficiency includes an instruction that converts the result corresponding to the calculated wireless charging efficiency into an indicator, a text, or a voice and outputs the converted indicator, the text, or the voice.

9. The electronic device of claim 5, wherein the instruction that outputs the result corresponding to the calculated wireless charging efficiency further includes an instruction that displays a graphic showing an orientation of the electronic device in correspondence to the orientation of the wireless charging pad.

* * * * *